Figure 1:
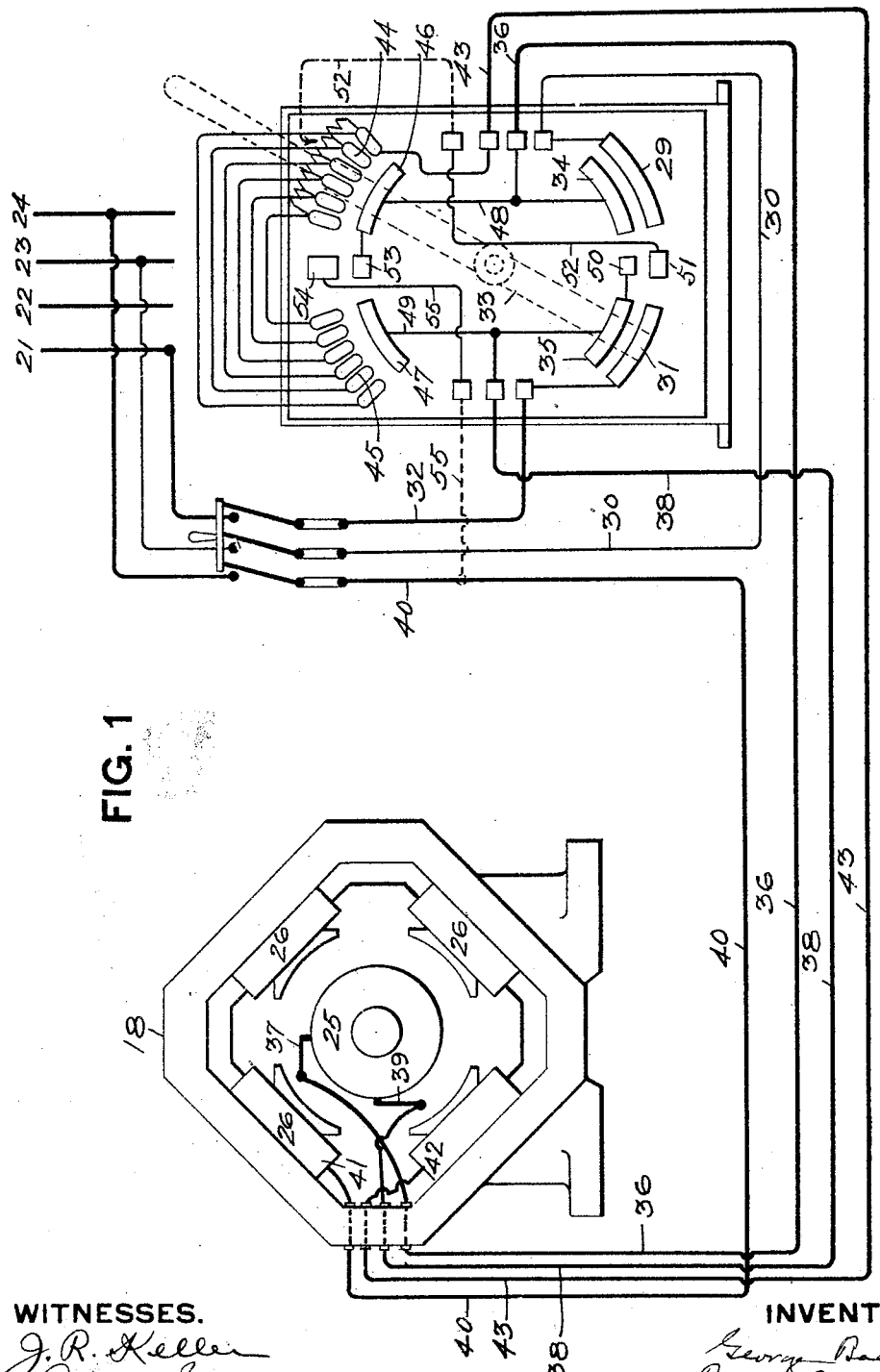

No. 842,515. PATENTED JAN. 29, 1907.
G. BAEHR.
ELECTRIC MOTOR SYSTEM.
APPLICATION FILED SEPT. 17, 1904.

2 SHEETS—SHEET 1.

WITNESSES.
INVENTOR.

No. 842,515. PATENTED JAN. 29, 1907.
G. BAEHR.
ELECTRIC MOTOR SYSTEM.
APPLICATION FILED SEPT. 17, 1904.

2 SHEETS—SHEET 2.

WITNESSES. INVENTOR.

UNITED STATES PATENT OFFICE.

GEORGE BAEHR, OF McKEESPORT, PENNSYLVANIA, ASSIGNOR TO NATIONAL TUBE COMPANY, OF PITTSBURG, PENNSYLVANIA, A CORPORATION OF NEW JERSEY.

ELECTRIC-MOTOR SYSTEM.

No. 842,515.

Specification of Letters Patent.

Patented Jan. 29, 1907.

Application filed September 17, 1904. Serial No. 224,893.

*To all whom it may concern:*

Be it known that I, GEORGE BAEHR, a resident of McKeesport, in the county of Allegheny and State of Pennsylvania, have invented a new and useful Improvement in Electric-Motor Systems; and I do hereby declare the following to be a full, clear, and exact description thereof.

My invention relates to electric-motor systems; and the object is to provide a system for driving a motor in reverse directions and at a greater speed in one direction than in the opposite direction, and which system is controlled by a simple lever-controller—that is, one having a movement back and forth in a single plane.

A further object of the invention is to apply a dynamic brake in a system of this character.

In many manufacturing plants it is the practice to drive the machinery by means of electric motors, and with many machines or mechanisms it is desirable to drive the same in one direction at a certain speed and in the opposite direction at a higher speed. It is also desirable that the reversing of such motors and change from one speed to another be controlled by means so simple in its manipulation that the operator cannot become confused and manipulate the same so to drive the motor in the wrong direction.

My invention is intended to secure the desirable object of driving a reversible motor at one speed in one direction and at another speed in another direction and to secure these movements by means of a lever-controller which is so simple that even a dull workman can manipulate the same with safety and without liability of confusing the necessary movements of the controller, and thus drive the motor in the wrong direction.

Heretofore motors have been driven from multiple-voltage circuits, a controlling device being employed to connect the motor to either one or another of said circuits, so as to drive the motor at different speeds. As far as I am aware heretofore this has only been accomplished by means of a rotary or other controller which must be brought to a number of different positions and by operating means which does not move in a single line or plane. As a result ignorant workmen become confused with reference to the movements of the controller and frequently manipulate the same to drive the motor in the wrong direction or at a wrong speed.

My invention is intended to overcome this, and it consists in the use in connection with a motor and a multiple-voltage circuit of a lever-controller having movement only in a single plane and having only two working positions, the arrangement being such that when the lever is moved to one position the motor will be connected to a circuit of one voltage and when the lever is moved to the opposite position the motor will be connected to a circuit of a different voltage and with the relative directions of the current through the armature and field-magnets reversed. As a result by the mere movement of the lever to the two different positions the motor can be driven in opposite directions and at one speed in one direction and a different speed in the opposite direction.

The invention also consists in providing an arrangement whereby the lever when in its neutral position will place the motor or at least the motor-armature in a closed circuit through a resistance, so that thereby the motor is converted into a generator and acts as a dynamic brake to check its own motion.

Figure 2:
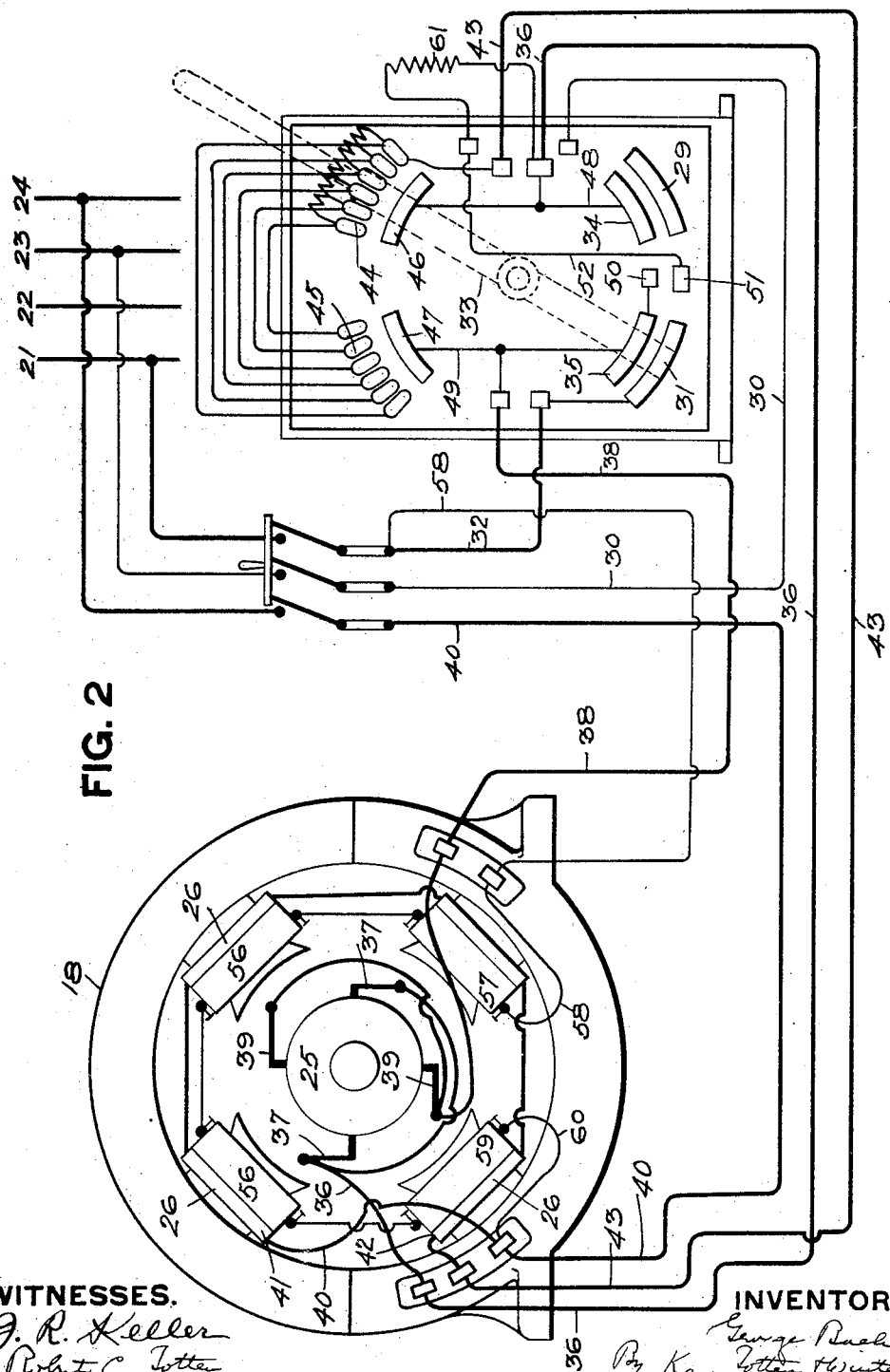

In the accompanying drawings, Figure 1 is a diagram of the circuits and controller when applied to a series-wound motor. Fig. 2 is a similar diagram showing the arrangement applied to a compound-wound motor.

In Fig. 1 is shown a diagram of a motor system employing a series-wound motor, which will be driven from a multiple-voltage circuit, the same comprising mains 21, 22, 23, and 24, connected to a suitable source of electric energy and in such a manner that the difference in potential between mains 21 and 22 is forty volts, between mains 22 and 23 is one hundred and twenty volts, and between mains 23 and 24 is eighty volts. As a consequence the difference in potential between mains 21 and 24 is two hundred and forty volts. My system is so arranged that for the high speed the motor is supplied with two hundred and forty volts—that is, connected to the mains 21 and 24, whereas for the slow speed the motor is supplied from the mains 23 and 24 and as a consequence receives only eighty volts.

The motor-armature is shown at 25 and the field at 26. The controller is provided with a contact 29, which is connected to the main 23 by a conductor 30, and also with a contact 31, which is connected to the main 21 by a conductor 32. These two main contacts 29 and 30 are arranged on opposite sides of the middle of the controller-board and will be respectively engaged by the lever-switch 33 when in its opposite positions. Arranged adjacent to the main contacts 29 and 31 are the armature-contacts 34 and 35, respectively, the former being connected by a conductor 36 to the one armature-brush 37, while the latter is connected, by means of the conductors 38, to the other armature-brush 39. The armature-contact 34 is so located with reference to the main contact 29 that it will be connected thereto by the lever-switch 33 in one of its working positions, while the armature-contact 35 is so located with reference to the main contact 31 that it will be connected thereto by said lever-switch when in its other working position.

The main 24 is connected, by means of a conductor 40, to one terminal 41 of the motor-field. The opposite terminal 42 of the field is connected, by means of a conductor 43, with resistance-contacts 44 and 45, arranged in two groups on opposite sides of the middle of the controller-board, which contacts hereinafter will be referred to as the "field-contacts." Arranged adjacent to each group of these field-contacts are the companion contacts 46 and 47, respectively, the former of which is permanently connected, by means of a conductor 48, to the armature-contact 34 and the latter of which is permanently connected, by means of a conductor 49, to the armature-contact 35.

The contacts and connections so far described are sufficient for securing the slow speed of the motor and the quick reverse speed. The dynamic brake is applied in the following way: On the neutral line of the controller-board and on the bottom thereof is a contact 50, permanently connected to the armature-contact 35, and which in turn is in permanent electrical connection with the armature-brush 39. Located in proximity to this, so as to be bridged by the lever-switch while in its neutral position, is a companion contact 51, which is permanently connected, by means of the conductor 52, with the field-contacts 44. On the upper side of the board is located a contact 53, which is in permanent electrical connection with the contact 46, which in turn is in permanent electrical connection with the armature-brush 37. In proximity to the contact 53, so as to be connected thereto by the lever-switch when in its neutral position, is another contact 54, which is connected to the conductor 40 by means of a conductor 55.

The foregoing describes all the essential parts of the motor system for getting the variable speed and dynamic braking effect for the motor. The lever-switch 33 is pivoted centrally of the various contacts described and is arranged to be moved into two working positions, as well as in a neutral position. In one working position it will connect the contacts 29 and 34 and 45 and 47. In the other working position it will bridge the contacts 31 and 35 and 44 and 46, while in its neutral position it will bridge the contacts 50 and 51 and 53 and 54. It has no other positions, and consequently the movements thereof are very simple, which will prevent confusion on the part of the operator.

When the controller-lever is in the position to bridge terminals 29 and 34 and 45 and 47, the motor will be driven in one direction, the current being then supplied to the motor from the mains 23 and 24, so that the motor receives eighty volts only. In this position of the lever-switch the course of the current is as follows: From the main 24 by means of conductor 40 to the terminal 41 of the motor-field, through said field and out by terminal 42, thence by conductor 43 to the field-contacts 44 of the controller-board, from these to the contacts 45, thence through the lever-switch to the companion contact 47, thence by means of conductor 49 to conductor 38, to the armature-brush 39, through the armature-winding and out by the armature-brush 37, thence by conductor 36 to conductor 48, to the armature-contact 34, thence through the lever-switch to the main contact 29, and thence by conductor 30 to the main 23. It will be seen that in this position the lever-controller connects the field and armature of the motor in series and that the same is supplied with current from the conductors 23 and 24. As the difference in potential between these two conductors is eighty, it is apparent that the motor will be driven at a slow speed.

To reverse the motor, the controller-lever will be quickly moved to its opposite working position, in which it bridges contacts 31 and 35 and 44 and 46. In this position the circuit will be from the main 24 by means of conductor 40 to the motor-field and through said field in the same direction as in the opposite position of the controller-lever. From the field the current passes by means of conductor 43 to the field-contacts 44, thence through the lever-switch to the companion contact 46, thence by conductor 48 to conductor 36, to the armature-brush 37, thence through said armature and out by the brush 39, thus traversing said armature in the opposite direction from which it did when the lever-switch was in its opposite position. From brush 39 the current passes, by means of conductors 38 and 49, to the armature-contact 35, thence through the lever-switch to the main contact 31, and through the conductor 32 to the main 21. As a result the motor-field and armature will be connected in series; but the current through the armature will be reversed with reference to its direction when the switch was in the opposite position. Consequently the motor will be driven in the opposite direction. It will also receive its current from the mains 21 and 24, the difference of potential of which is two hundred and forty volts, so that the motor will be driven at a materially higher speed than in its opposite direction.

Inasmuch as the motor is running at a very high reverse speed, damage might result if the switch were moved rapidly over to the opposite working position, so as to reverse the motor. Consequently I apply a dynamic brake at this point, this brake being applied by moving the controller-lever to its neutral position, so that it will bridge contacts 50 and 51 and 53 and 54. In this position of the lever-switch the mains will be entirely cut out and the motor will be placed in closed circuit and through the field resistance 44 of the controller. In this position of the lever the circuit, beginning with the armature-brush 39, is as follows: From said brush by means of the conductors 38 and 49 to contact 35, thence to the braking-contact 50, thence through the lever-switch to contact 51, through conductor 52 to the field-contacts 44, passing through said resistance, which can be varied by connecting the end of the conductor 52 to different ones of the field-contacts 44. From the contacts 44 the circuit is by means of conductor 43 to the field-terminal 42, through said field and out at the terminal 41, thence by conductors 40 and 55 to the contact 54, thence through the lever-switch to contact 53, thence to contact 46, through conductors 48 and 36 to the opposite armature-brush 37, and through said armature to the brush 39, which is the point of beginning. In this way the motor field and armature are in a closed circuit through the resistance 44, and as a consequence said motor will become a generator and will thus be quickly and smoothly brought to a stop.

In Fig. 2 is shown a compound-wound motor for securing the same result. This motor is provided not only with the series field 26, but also with the shunt-field 56, which shunt-field has its one terminal 57 connected, by means of a conductor 58, to the conductor 32, leading to the main 21, and its opposite terminal 59, connected by a conductor 60 to the conductor 40, connected to the main 24. The contacts on the controller-board are in general arranged the same as in Fig. 1, the difference being the contacts 53 and 54 and conductor 55 are omitted. Also the conductor 52, leading from contact 51 instead of being connected to the field-resistance contacts 44, as in Fig. 1, is connected to the conductor 36 and is provided with an external variable-resistance device 61. With this arrangement current is always flowing through the shunt-field 56, because said field is permanently connected by means of the conductors 58 and 60 to the mains 21 and 24.

When the lever-controller is moved to the position to bridge contacts 29 and 34 and 47 and 45, the course of the current is exactly the same as with the arrangement shown in Fig. 1, the motor-armature and series field-magnets being in series and being supplied from the mains 23 and 24 with a current of eighty volts, while the shunt-magnets of the motor are supplied directly from the mains 21 and 24 with a current of two hundred and forty volts. The motor in this position of the switch will, however, be driven at its slow speed.

When the lever-switch is moved to its opposite working position—that is, bridging the contacts 31 and 35 and 44 and 46—the current also will follow the same course as with the modification shown in Fig. 1. In this position of the switch the shunt-field will be supplied directly from the mains 21 and 24 at two hundred and forty volts and the series field and armature also will be supplied from the same mains, and as a consequence the motor will be driven in the reverse direction and at the high speed.

When the lever is moved to its neutral position, it will bridge the contacts 50 and 51. In this position the current coming from the armature-brush 39 passes, by means of conductors 38 and 49, to contact 35, thence to contact 50, thence through the lever-switch to contact 51, thence by means of conductor 52 through the resistance device 61 to the conductor 36, and by means of the same to the opposite armature-brush 37. The field 26 in this modification is not placed in series with the armature, as is the case in the arrangement shown in Fig. 1, but the armature itself is placed in closed circuit through the resistance 61. The shunt-magnets being permanently connected to the mains will give a sufficient field to produce the generating effect. The resistance 61 in this case takes the place of the field-resistance 44 of the other modification.

It will thus be seen that either a series-wound or a compound-wound motor can be employed and that by means of the contact arrangement shown a simple lever-switch can be employed for connecting said motor to mains of different voltage, so as to drive the motor in one direction at a slow speed and in the opposite direction at a higher speed, and also to place the motor, or at least the motor-armature, in a closed circuit, so that the motor will act as a generator, and thus produce a braking effect.

What I claim is—

1. In an electric-motor system, the combination with a motor, of a multiple-voltage circuit connected thereto, and means for changing the motor connections from a circuit of high voltage to a circuit of low voltage, and vice versa, whenever the direction of rotation of the motor is changed.

2. In an electric-motor system, the combination with a motor having a series field, of a multiple-voltage circuit connected to said motor, and means for changing the motor connections from a circuit of high voltage to a circuit of low voltage, and vice versa, whenever the direction of rotation of the motor is changed.

3. In an electric-motor system, the combination with a motor, of a multiple-voltage circuit therefor, and a controller between said motor and circuit, said controller being arranged so that in one position it will connect the motor to a circuit of one voltage, and in another position it will connect the motor to a circuit of different voltage, and with the relative direction of the current through the motor field and armature reversed.

4. In an electric-motor system, the combination with a motor having a series field, of a multiple-voltage circuit therefor, and a controller connecting said motor and circuit and mounted to assume two positions, said controller being arranged so that when in one position it will connect the motor to a circuit of one voltage, and in another position it will connect the motor to a circuit of different voltage, and with the relative direction of the current through the motor field and armature reversed.

5. In an electric-motor system, the combination with a motor, of a multiple-voltage circuit therefor, and a controller interposed between said motor and circuit and comprising a lever-switch mounted to assume two positions and so arranged that in one position it will connect the motor to a circuit of one voltage and in another position it will connect the motor to a circuit of a different voltage and with the relative direction of the current through the motor field and armature reversed.

6. In an electric-motor system, the combination with a motor, of a multiple-voltage circuit therefor, a controller connecting said motor and circuit, said controller being so arranged that when in one working position it will connect the motor to a circuit of one voltage, and in another working position it will connect the motor to a circuit of different voltage and with the relative direction of the current through the motor field and armature reversed, and a brake operated by said controller when in its neutral position.

7. In an electric-motor system, the combination with a motor, of a multiple-voltage circuit therefor, and a controller between said motor and circuit, said controller comprising a lever-switch mounted to move in a single plane and to assume two working positions and a neutral position, the arrangement being such that in one working position said lever will connect the motor to a circuit of one voltage, and in its other working position it will connect the motor to a circuit of different voltage and with the relative direction of the current through the motor field and armature reversed, and in its neutral position it will place the motor-armature in a closed circuit.

8. In an electric-motor system, the combination with a motor, of a multiple-voltage circuit therefor, a lever-controller interposed between said motor and circuit, said controller comprising a lever mounted to move in a single plane and to assume two working positions and a neutral position, the arrangement being such that in one working position it will connect the motor to a circuit of one voltage, and in the other working position it will connect the motor to a circuit of different voltage and with the relative direction of the current through the field and armature reversed, and in its neutral position it will place the motor-armature in a closed circuit, and a resistance in said closed circuit.

9. In an electric-motor system, the combination with a motor, of a multiple-voltage circuit therefor, and a controller interposed between said motor and circuit and comprising a lever-switch mounted to move in a single plane and to assume two working positions and a neutral position, the arrangement being such that said lever in one working position will connect the motor to a circuit of one voltage, and in the other working position it will connect the motor to a circuit of a different voltage and with the relative direction of the current through the field and armature reversed, and in the neutral position it will connect the motor field and armature in series and place the same in a closed circuit.

10. In an electric-motor system, the combination with a motor, of a multiple-voltage circuit therefor, and a controller in said circuit and comprising a lever-switch arranged to assume two positions and to bridge contacts in both positions, said contacts being so arranged that in one position of the lever the motor will be connected to a circuit of one voltage and with the field and armature in series and so that the current traverses both field and armature in the same direction, and in the other position of the lever the motor will be connected to a circuit of a different voltage and with the field and armature in series but so that the current traverses the same in opposite directions.

11. In an electric-motor system, the combination with a motor, of a multiple-voltage circuit therefor, and a controller in said circuit, the same comprising a lever-switch arranged to assume two working positions and a neutral position and bridge contacts in all positions, said contacts being so arranged that in one position of the lever the motor will be connected to a circuit of one voltage and with the current traversing both the field and armature in the same direction, and in the other working position the motor will be connected to a circuit of a different voltage and so that the current traverses the field and armature in opposite directions, and in the neutral position the motor-armature will be placed in a closed circuit.

12. In an electric-motor system, the combination with a motor, of a multiple-voltage circuit therefor, a controller in said circuit, the same comprising a lever-switch arranged to assume two working positions and a neutral position and bridge contacts in all positions, said contacts being so arranged that in one position of the lever the motor will be connected to a circuit of one voltage and with the current traversing both the field and armature in the same direction, and in the other working position of the lever the motor will be connected to a circuit of different voltage and so that the current traverses the field and armature in opposite directions, and in the neutral position of the lever the motor-armature will be placed in a closed circuit, and a resistance device in said closed circuit.

13. In an electric-motor system, the combination of a motor, of a multiple-voltage circuit therefor, and a controller in said circuit and comprising a lever-switch arranged to assume two working positions and a neutral position and to bridge contacts in all positions, said contacts being so arranged that in one position of the lever the motor will be connected to a circuit of one voltage and so that the current traverses both the field and armature in the same direction, and in the other working position of the lever the motor will be connected to a circuit of a different voltage and so that the current traverses the field and armature in opposite directions, and in the neutral position of the lever the motor field and armature will be placed in series and in a closed circuit.

14. A motor-controller for a multiple-voltage circuit, the same comprising a lever-switch arranged to assume two positions and to bridge contacts in both positions; said contacts comprising two main contacts one to be connected to a main of one voltage and the other to a main of another voltage, a pair of contacts to be connected to the opposite terminals of the motor-armature and one thereof in proximity to each main contact and arranged to be connected to the same by the lever-switch in its two positions, a pair of field-contacts permanently connected to each other and adapted to be connected to the motor-field, a companion contact in proximity to each field-contact and arranged to be connected thereto by the lever in its two positions, and permanent connections between each of the armature-contacts and one of the companion field-contacts.

15. A motor-controller for a multiple-voltage circuit, said controller comprising a lever-switch arranged to assume two working positions and a neutral braking position and to bridge contacts in all of said positions, said contacts comprising two main contacts one to be connected to a main of one voltage and the other to a main of another voltage, a pair of contacts to be connected to the opposite terminals of the motor-armature and one thereof in proximity to each main contact and arranged to be connected to the same by the lever in its two working positions, a pair of field-contacts permanently connected to each other and to be connected to the motor-field, a companion contact located in proximity to each field-contact and arranged to be connected thereto by the lever in its two working positions, permanent connections between each of the armature-contacts and one of the companion field-contacts, a pair of contacts arranged to be bridged by the lever in its neutral position, one of said contacts to be connected to one armature-terminal, and the other of said contacts to be connected to the other armature-terminal.

16. A motor-controller for a multiple-voltage circuit said controller comprising a lever-switch arranged to assume two working positions and a neutral braking position and to bridge contacts in all of said positions, said contacts comprising two main contacts one to be connected to a main of one voltage and the other to a main of another voltage, a pair of contacts to be connected to the opposite terminals of the motor-armature and one thereof in proximity to each main contact and arranged to be connected to the same by the lever in its two working positions, a pair of field-contacts permanently connected to each other and to be connected to the motor-field, a companion contact located in proximity to each field-contact and arranged to be connected thereto by the lever in its two working positions, permanent connections between each of the armature-contacts and one of the companion field-contacts, a pair of contacts arranged to be bridged by the lever in its neutral position, one of said contacts to be connected to one armature-terminal, a conductor for connecting the other of said contacts to the other armature-terminal, and a resistance device in said conductor.

17. A motor-controller for a multiple-voltage circuit, said controller comprising a lever-switch arranged to assume two working positions and a neutral braking position and to bridge contacts in all of said positions, said contacts comprising two main contacts one to be connected to a main of one voltage and the other to a main of another voltage, a pair of contacts to be connected to the opposite terminals of the motor-armature and one thereof in proximity to each main contact and arranged to be connected to the same by the lever in its two working positions, a pair of field-contacts permanently connected to each other and to be connected to the motor-field, a companion contact located in proximity to each field-contact and arranged to be connected thereto by the lever in its two working positions, permanent connections between each of the armature-contacts and one of the companion field-contacts, two pairs of contacts arranged to be bridged by the lever in its neutral position, one contact of one pair to be connected to one terminal of the motor-armature and one contact of the other pair to be connected to the opposite terminal of the motor-armature, and the other contact of the one pair to be connected to one terminal of the motor-field and the other contact of the other pair to be connected to the other terminal of the motor-field.

In testimony whereof I, the said GEORGE BAEHR, have hereunto set my hand.

GEORGE BAEHR.

Witnesses:
ROBERT C. TOTTEN,
G. KREMER.